F. L. SCHULZ & W. KRAFT.
TERMINAL BOX.
APPLICATION FILED AUG. 21, 1916.
1,270,062.
Patented June 18, 1918.
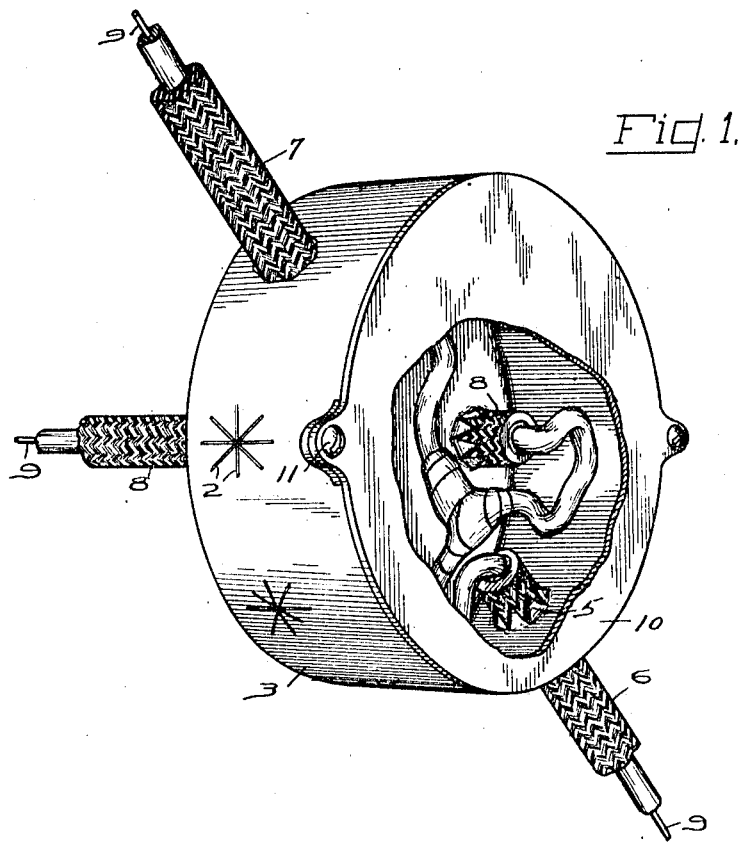
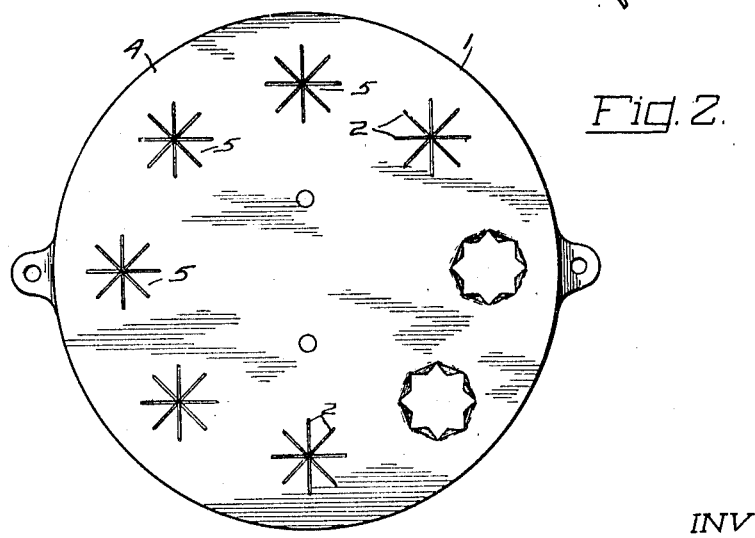
INVENTOR
Frederick L. Schulz
William Kraft
by
Owen, Owen & Leary

UNITED STATES PATENT OFFICE.

FREDERICK L. SCHULZ AND WILLIAM KRAFT, OF TOLEDO, OHIO.

TERMINAL BOX.

1,270,062.                Specification of Letters Patent.      Patented June 18, 1918.

Application filed August 21, 1916. Serial No. 116,033.

*To all whom it may concern:*

Be it known that we, FREDERICK L. SCHULZ and WILLIAM KRAFT, citizens of the United States, and residents of Toledo, in the county of Lucas and State of Ohio, have invented certain new and useful Terminal Boxes; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to loom fasteners. It particularly relates to means provided in connection with plates or terminal boxes which are so constructed that the loom fastener may be punched out from the wall of the box and will form thereby not only an opening through the box or plate through which the loom containing the wire to be insulated, may extend, but, also, at the same time, the material of the plate or box will operate to form engaging points which will lock the loom in position and prevent its withdrawal from the plate or box. The box or plate will thus be closed at all points and there will be no extra openings through which the material may enter the opposite side of the plate or within the terminal box and at the same time an efficient loom fastener, which is exceedingly simple, will be formed upon forming the opening or passageway for the wire and its insulating loom.

The invention may be contained in structures partaking of different forms and may be used for a great variety of purposes for forming openings or passageways into boxes or through plates and at the same time forming locking means for the devices that may be inserted through such openings or passageways.

One form of the invention is illustrated in the drawings, wherein,

Figure 1 is a perspective view of a terminal box containing the invention, and Fig. 2 is a rear view of the box showing openings punched out and at the same time loom fasteners formed around the openings.

In the form of the invention shown, 1 is a terminal box, which, however, may be a plate of any form through which the wires insulated by looms are to be inserted and locked in position. In the bottom of the box are a plurality of cuts 2 arranged star-like, disposed preferably at a plurality of points on the closing walls of the box, such as the wall 3 and the bottom 4 of the box. The stars 5 thus formed by the cuts 2 may be arranged in any suitable manner to provide for all the reasonable possible positions for the reception of wires having looms extending toward the box from different directions. When it is desired to form one or more openings through the walls all that is necessary is to punch out the stars by placing a suitable punch at the center of the star or stars located in that position or those positions on the wall or walls of the box which will be the better for the receipt of the wire and then forcing the corners formed between the cuts inward by driving the punch into the box. If different sized looms are used different sized punches may be used or the punch may be driven different distances within the box. The prongs that will thus be formed by the corners between the cuts will slope toward each other and take on the form of the conical surface of the punch. When the loom is pushed into the box through the opening thus formed the prongs will permit the loom to be moved inward, but upon withdrawal of the loom the prongs will set into the material of the loom and lock the end of the loom within the box. In the form of the invention shown, looms 6 and 7 extend through the side wall of the box and a loom 8 extends through the bottom of the box. The looms contain and insulate the wires 9.

The terminal box 1 may be closed by a suitable cover 10 which may be secured by screws 11 which pass through ears located on the cover and the box.

We claim:

A closed terminal box having sheet metal walls, a plurality of sets of cuts radiating from a common point in the inclosing walls of the terminal box forming sharp engaging corners of the sheet metal in the apices of the radiating cuts when punched to open the box to receive the terminals.

In testimony whereof, we have hereunto signed our names to this specification.

FREDERICK L. SCHULZ.
WILLIAM KRAFT.

Copies of this patent may be obtained for five cents each, by addressing the "Commissioner of Patents, Washington, D. C."